J. L. BEENE.
DRAFT EQUALIZER.
APPLICATION FILED DEC. 20, 1919.
1,354,796.
Patented Oct. 5, 1920.
2 SHEETS—SHEET 2.
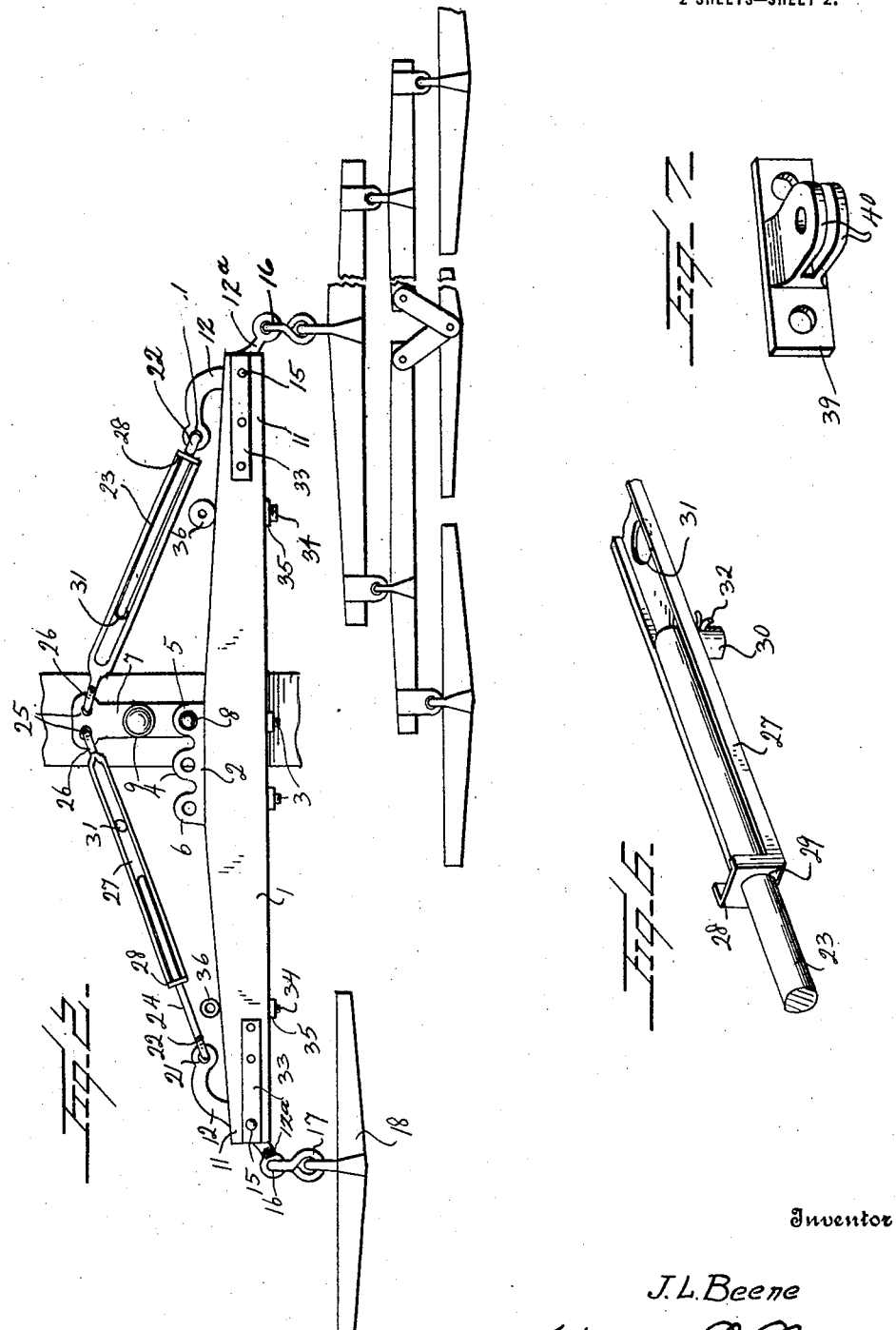
Inventor
J. L. Beene
By Watson E. Coleman
Attorney

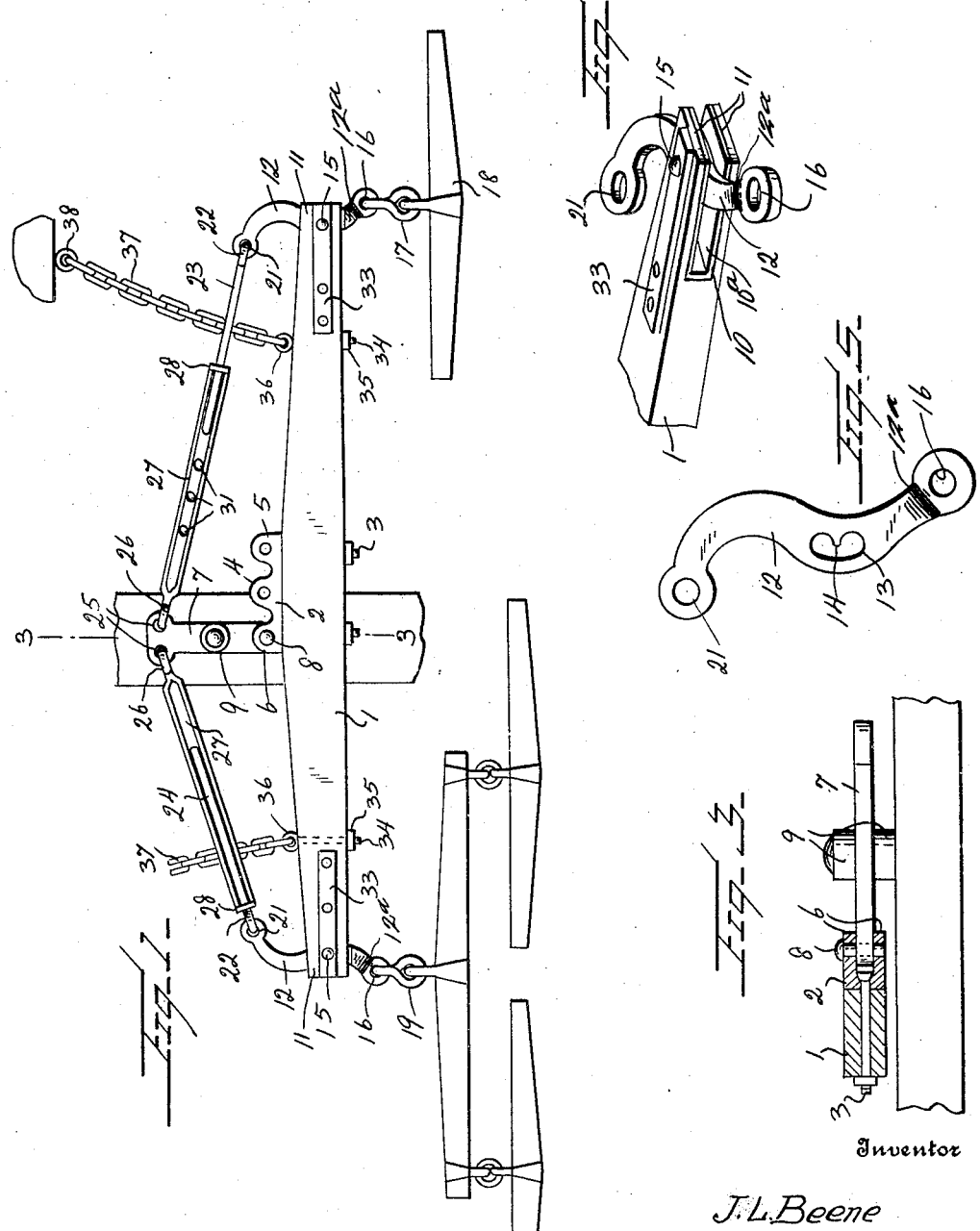

UNITED STATES PATENT OFFICE.

JOHN L. BEENE, OF CENTRAHOMA, OKLAHOMA, ASSIGNOR OF ONE-HALF TO SAMUEL A. MAXWELL, OF COALGATE, OKLAHOMA.

DRAFT-EQUALIZER.

1,354,796.  Specification of Letters Patent.  Patented Oct. 5, 1920.

Application filed December 20, 1919. Serial No. 346,288.

*To all whom it may concern:*

Be it known that I, JOHN L. BEENE, a citizen of the United States, residing at Centrahoma, in the county of Coal and State of Oklahoma, have invented certain new and useful Improvements in Draft-Equalizers, of which the following is a specification, reference being had to the accompanying drawings.

This invention relates to improved draft equalizers for use in connection with vehicles in general, and in connection with agricultural implements in particular, and an object of the invention is to provide a device of this kind, which may be manufactured for a small cost and sold at a reasonable profit.

Another object of the invention is to provide an equalizer particularly adapted for equalizing the draft between the draft animals, by means of a shifting beam, which is capable of shifting incident to the pull of one animal on one end of the equalizer against two animals adapted to connect to the other end of the equalizer and vice versa, or to equalize the draft between two animals, one on each end of the equalizer, one being more powerful than the other.

A still further object of the invention is to provide an equalizer including a main shifting equalizing beam having a supporting plate, which is pivotally mounted upon a shifting or pivoted lever adjustably, and adapted to shift laterally, according to the pull of one animal against the other, or the pull of one animal against two, or two against three and vice versa, said draft animal connected to either end of the equalizer, in connection with pivoted elbow levers, which are in turn provided with adjustable connections with the rear end of the pivoted shifting lever, to insure equalization of the draft between the animals of the opposite ends of the equalizer.

An additional object of the invention is to provide means for supporting the main equalizing shifting draft beam, substantially on the same plane with the pivotal mounting of the pivoted lever, so as to permit the shifting beam to function properly transversely of the tongue of the vehicle or agricultural implement.

Also it is the aim of the invention to provide improved adjustable connections between the pivoted elbow levers with the ends of the main shifting draft equalizing beam, whereby the elbow levers may be arranged to compensate for the draft between the animals.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a plan view of the improved draft equalizer constructed in accordance with the invention, and showing the draft equalizing parts adjusted for use in connection with the animals, one on one end of the equalizer and two on the opposite end of the equalizer.

Fig. 2 is a plan view showing the draft equalizing parts as having been shifted and arranged so as to coöperate with draft animals, one on one end pulling against three animals connected to the opposite end of the equalizer.

Fig. 3 is a sectional view on line 3—3 of Fig. 1, showing how the main equalizing beam is supported on the tongue of the vehicle or agricultural implement or machine.

Fig. 4 is an enlarged detail view of one end of the main shifting equalizing draft beam, showing one of the elbow levers pivotally mounted.

Fig. 5 is a detail view of one of the elbow levers.

Fig. 6 is a detail view of the adjustable connections between one end of one of the elbow levers and the pivoted shifting lever.

Fig. 7 is a detail view of a modified form of plate for connecting the pivoted shifting lever 7 to the main draft equalizing beam.

Referring more especially to the drawings, 1 designates the main shifting draft equalizing beam, to which a plate 2 is secured by means of the bolts 3. This plate 2 is provided with a plurality of rearwardly extending lugs 4, 5 and 6 respectively arranged in pairs. A pivoted shifting lever 7 is provided, and its forward end is adapted for pivotal connection between either pair of rearwardly extending lugs 4, 5 and 6, by means of a pivot bolt 8. For instance, if a single draft animal is connected to the left hand end of the equalizer and two draft animals are connected to the right hand end of the equalizer, the shifting levers 7 may be connected between the lugs 6, in which case the beam 1 will be shifted toward the left. Should the single animal be connected to the right hand end of the equalizer, then the shifting pivoted lever 7 should be pivotally mounted between the lugs 5. Should there be a single animal on either end pulling against three animals on the opposite end, the shifting pivoted lever 7 is pivoted between either of the end lugs 5 and 6. However, when this is the situation, then the draft or the pull between the animals is further equalized, through the adjustment of the connections between the rear end of the pivoted shifting lever 7, and the ends of the equalizing beam. In order to support the main equalizing beam on a plane with the center of the pivoted lever 7, the upper and lower faces of the lever 7 are provided with circular bosses or enlargements 9. These bosses, it depending on the one which is engaging the face of the tongue of the vehicle, support the main equalizing beam, so that it may be easily shifted transversely of the tongue without being obstructed. Furthermore, the main equalizing beam can automatically shift as the draft animals pull, the animals on one end against the animals of the opposite end.

The opposite ends of the main equalizing beam are bifurcated as shown at 10 and pivoted between the forks 11 (which are caused to be formed by the bifurcations) are elbow levers 12. These levers are substantially of the shape shown, though not necessarily, for it is obvious that they may be otherwise shaped. The opening 13 of each lever 12 is elongated in form, and arcuately shaped. One edge of the opening 13 is provided with a centrally disposed lug 14, acting as retaining means, namely to hold the pivot bolt 15 of the elbow lever in either end of the elongated opening 13. It will be noted that when the pivot bolt 15 is in engagement with one end of the opening 13, say for instance, nearest the forward end of the elbow lever, the leverage of the forward end of the elbow lever is decreased. Should the pivot bolt 15 engage the rear or opposite end of the opening 13, then the leverage of the forward end of the elbow lever will be increased. Obviously, the elbow levers are adjusted according to the strength of the animals, and according to the number of animals connected to the equalizer. The forward ends of the elbow levers are provided with openings 16, into which a connection 17 of a swingle tree 18, as shown in Fig. 1, may be connected, and to which a connection 19 of a double tree 20 may be connected, as shown in Fig. 2. The rear ends of the elbow levers are provided with openings 21 to which the hooked ends 22 of the links or bars 23 and 24 are connected. The rear end of the pivoted shifting lever 7 has openings 25 into which the hooked ends 26 of the rods or links 27 are connected. The links or rods 27 telescopically receive the bars or links 23 and 24. The lateral ends of the links or bars 27 are provided with bent ends 28 provided with openings 29, through which the links or rods 23 and 24 pass. The inner ends of the links or rods 23 and 24 have lateral extremities 30, which may engage through any of the openings 31 formed in the circular links or rods 27, so as to hold the links in different extensible or adjustable positions. The lateral extremities of the links 23 and 24 receive cotter pins 32 to hold the lateral extremities in engagement with the openings 31, so as to insure holding the links in different adjusted positions.

The end parts of the main shifting draft equalizing beam are reinforced by the upper and lower strengthening plates 33, which are secured in place.

Extending transversely of the main equalizing beam near its opposite ends are rods 34, the forward ends of which have nuts 35 while their rear ends terminate in eyes 36, to which suitable chains 37 may be connected, in order to limit the equalizing beam in its shifting movement to an extent. These chains 37 are in turn connected at 38 to a portion of the vehicle or farming implement.

In Fig. 7 there is illustrated a modified construction of plate 39 designed for supporting the pivoted shifting lever 7 on the main equalizing beam 1. This plate 39 is formed in one piece, and is provided with rearwardly extending parallel ears or lugs 40, between which the pivoted shifting lever 7 is pivoted.

The opposite walls of the bifurcations 10 of the shifting draft equalizing beam are provided with metal linings 10ª which conform to the bifurcations and in which the elbow levers 12 operate, to prevent wear on the walls of the bifurcations. The main draft equalizing beam has a free swinging movement, and does not in any way contact with the tongue, since it is held in a raised position above the upper face of the tongue. The forward ends of the elbow levers are turned partially upwardly approaching a level with the upper face of the main equalizing beam, to prevent any contact of the swingle trees with the tongue during the lateral movements of the equalizing apparatus. Also the shifting lever 7 has a free movement relative to the main beam and the tongue.

The invention having been set forth, what is claimed as new and useful is:—

1. In a draft equalizer, the combination with a main equalizing beam having a plate connected centrally thereto, of a pivoted shifting lever pivotally mounted substantially midway its ends on the tongue of the vehicle and having its forward end adjustably pivoted to said plate, whereby the equalizing beam may be adjustable transversely of the tongue, while the pivoted shifting lever remains in a horizontal parallel plane with the tongue, stay chains connecting the opposite ends of the main equalizing beam, and a fixed part of the vehicle, elbow levers pivoted to the opposite ends of the main equalizing beam, said elbow levers having their forward ends turned laterally outwardly, and their rear ends turned laterally inwardly toward each other, links connected to the inwardly laterally extending ends of the elbow levers, links connected to the rear end of the pivoted shifting lever of the tongue and adjustable connections between the links, whereby the pull between the animals of the opposite ends of the equalizer may be equalized, a swingle tree connected to the forward end of one of said elbow levers, and a double tree connected to the forward end of the other elbow lever.

2. In a draft equalizer, the combination with a main equalizing beam having a plate connected to its central portion, said plate having a plurality of rearwardly extending lugs arranged in pairs, of a pivoted shifting lever pivoted to the tongue of the vehicle and having its forward end adapted to be connected between either set of lugs of said plate, stay chains connecting the opposite ends of the main equalizing beam, and a fixed part of the vehicle, elbow levers adjustably pivoted to the opposite ends of the main equalizing beam, and having their forward ends turned laterally outwardly and the rear ends turned laterally inwardly toward each other, links connected to the laterally inwardly turned ends, links connected to the rear end of the shifting lever and being semi-circular in cross section and provided at its outer ends with apertured ears through which the first links of the elbow levers pass, the inner ends of the first links of the elbow levers having lateral extremities, the links of the pivoted shifting lever having openings through which said lateral extremities engage, means carried by the lateral extremities to hold them in engagement with said opening, whereby the links are adjustably connected, a draft connection carried by the outwardly turned end of one of the elbow levers, and a draft connection carried by the outwardly turned end of the other elbow lever.

In testimony whereof I hereunto affix my signature.

JOHN L. BEENE.